(12) United States Patent
Siemens et al.

(10) Patent No.: US 10,995,819 B2
(45) Date of Patent: May 4, 2021

(54) ABSORBER SYSTEM

(71) Applicant: ZF FRIEDRICHSHAFEN AG, Friedrichshafen (DE)

(72) Inventors: Kyrill Siemens, Würzburg (DE); Zhaoyuan Dong, Jiuting Town (CN); Reinhold Fischer, Frankenblick (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/964,253

(22) PCT Filed: Dec. 11, 2018

(86) PCT No.: PCT/EP2018/084295
§ 371 (c)(1),
(2) Date: Jul. 23, 2020

(87) PCT Pub. No.: WO2019/145084
PCT Pub. Date: Aug. 1, 2019

(65) Prior Publication Data
US 2021/0041008 A1    Feb. 11, 2021

(30) Foreign Application Priority Data
Jan. 26, 2018  (DE) .................... 10 2018 201 199.0

(51) Int. Cl.
*F16F 15/14* (2006.01)

(52) U.S. Cl.
CPC ........ *F16F 15/145* (2013.01); *F16F 15/1414* (2013.01); *F16F 2222/08* (2013.01); *F16F 2230/007* (2013.01); *F16F 2232/02* (2013.01)

(58) Field of Classification Search
CPC ...... F16F 15/14; F16F 15/1407; F16F 15/145; F16F 15/1485; F16F 15/12; F16F 15/1202; F16F 15/131; F16F 2222/08; F16F 2230/007; F16F 2232/02
See application file for complete search history.

(56) References Cited

FOREIGN PATENT DOCUMENTS

| DE | 102011086436 | 6/2012 |
|---|---|---|
| DE | 102013204711 | 9/2014 |
| DE | 102016200129 | 8/2016 |
| DE | 102015225635 | 6/2017 |
| EP | 3222876 | 9/2017 |
| WO | WO 2011147632 | 12/2011 |

OTHER PUBLICATIONS

Machine Translation of DE 10 2011 086 436, obtained Dec. 31, 2020.*
Machine Translation of EP 3,222,876, obtained Dec. 31, 2020.*
Office Action of the corresponding German Patent Application No. 10 2018 201 199.0

* cited by examiner

Primary Examiner — Richard W Ridley
Assistant Examiner — Brian J McGovern
(74) Attorney, Agent, or Firm — Cozen O'Connor

(57) ABSTRACT

A mass damper system is provided with a damper mass carrier at which damper masses are relatively movably received and a stop is fastened. The damper masses are arranged radially outwardly of the stop and provided at their radial sides facing the stop with contact areas that cooperate with profile areas provided at the stop and which are provided at radial sides facing the damper masses. The stop has at least one stop carrier and at least one stop damper connected to the stop carrier via a radial securing element.

13 Claims, 15 Drawing Sheets

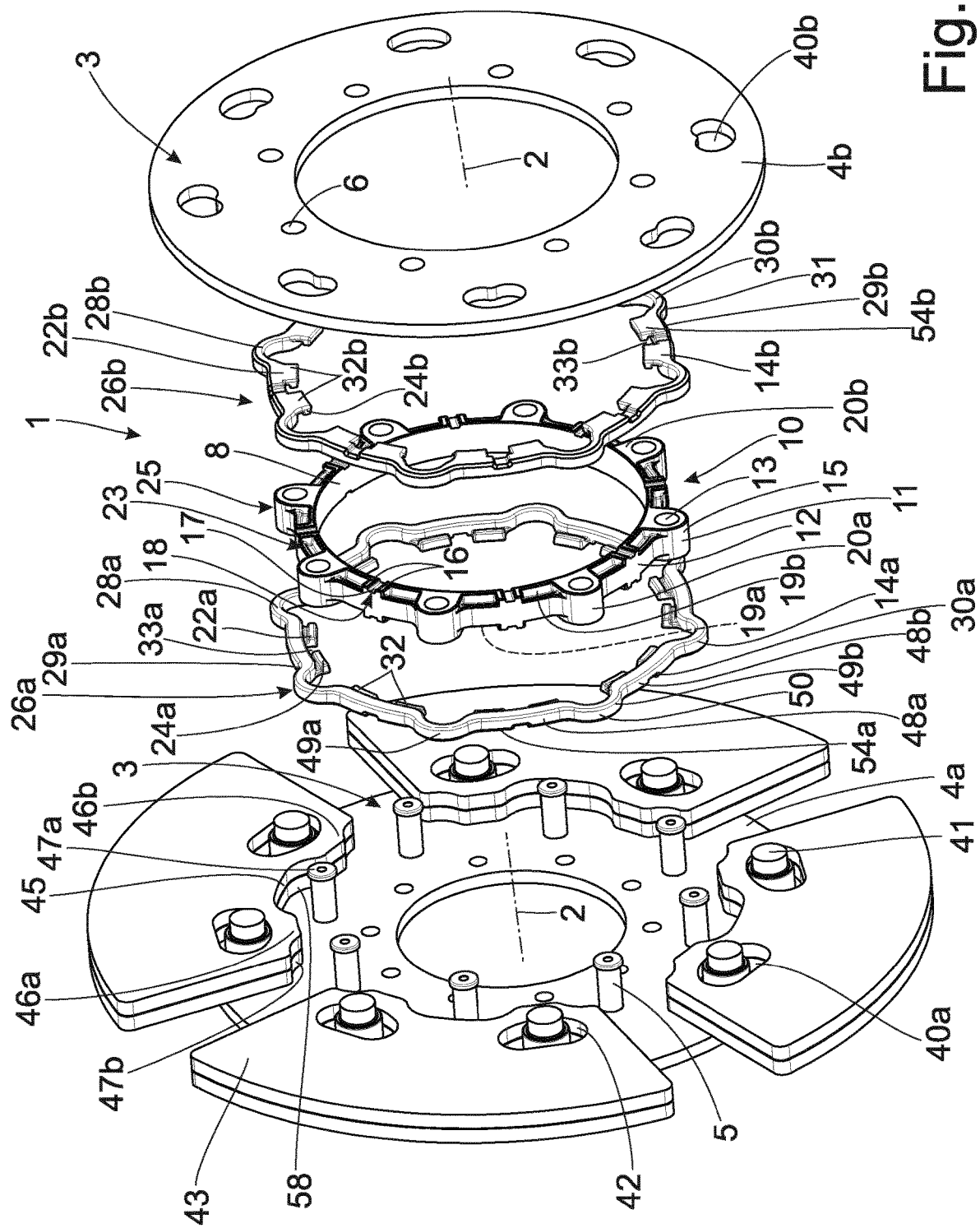

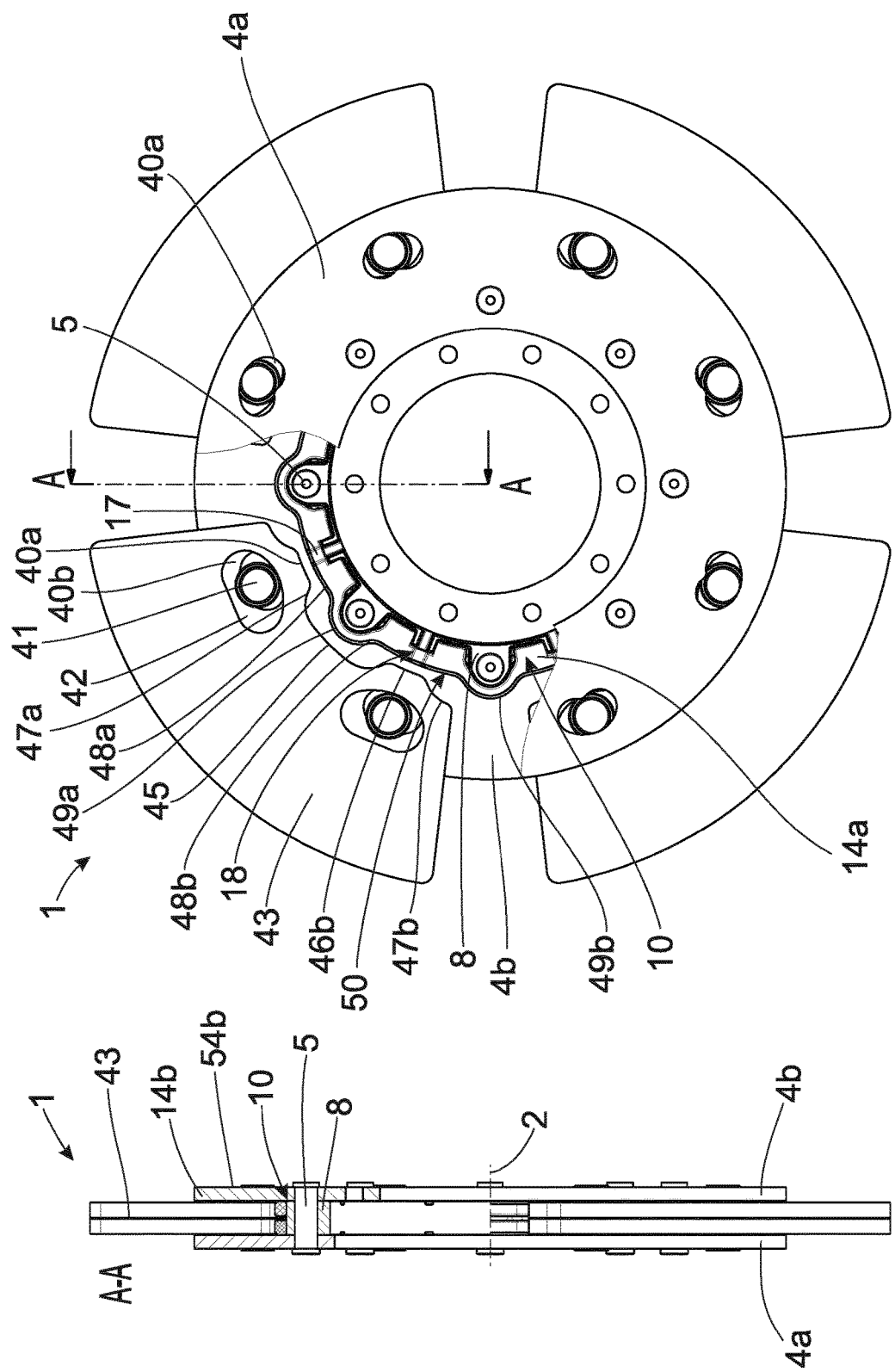

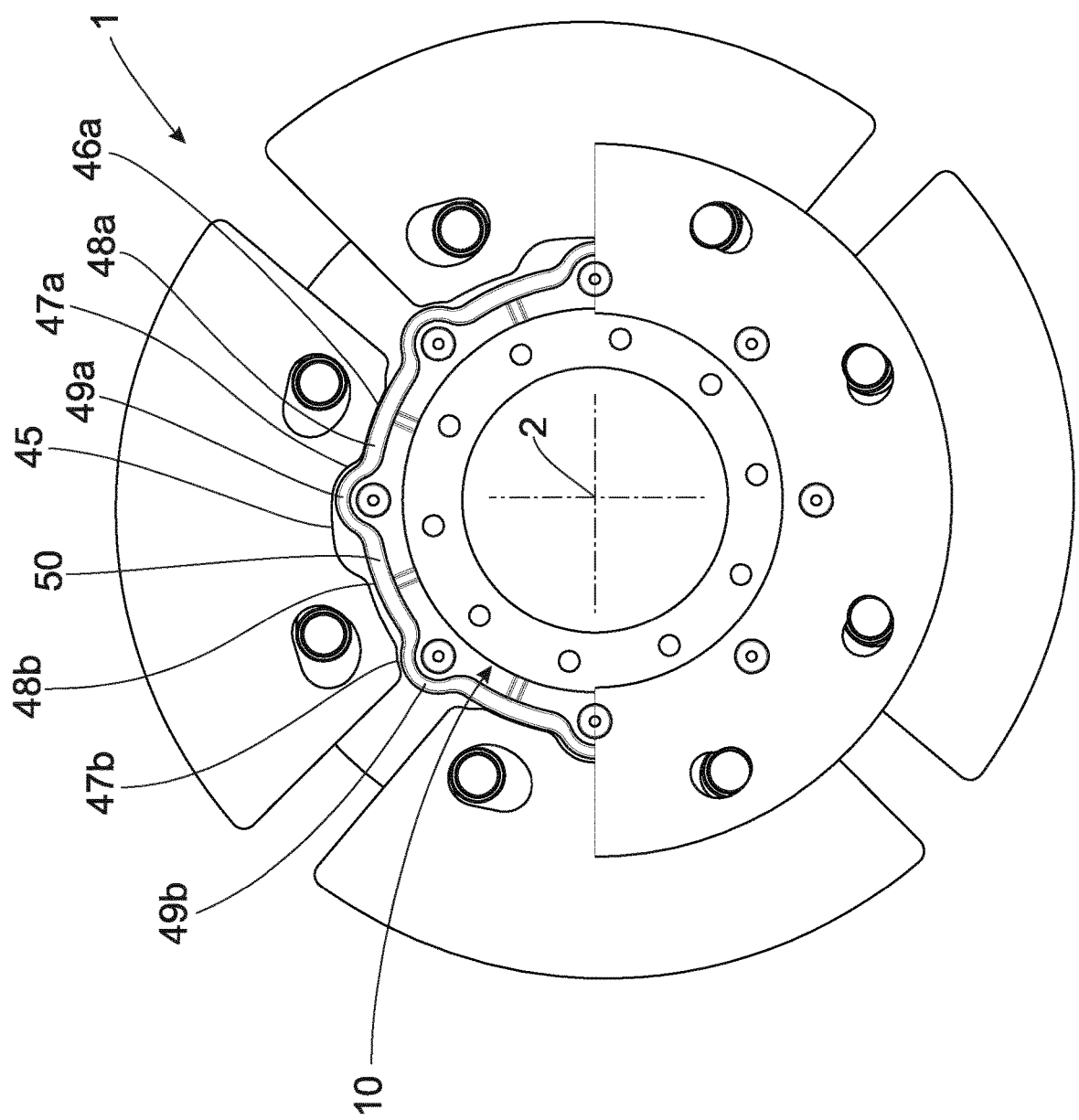

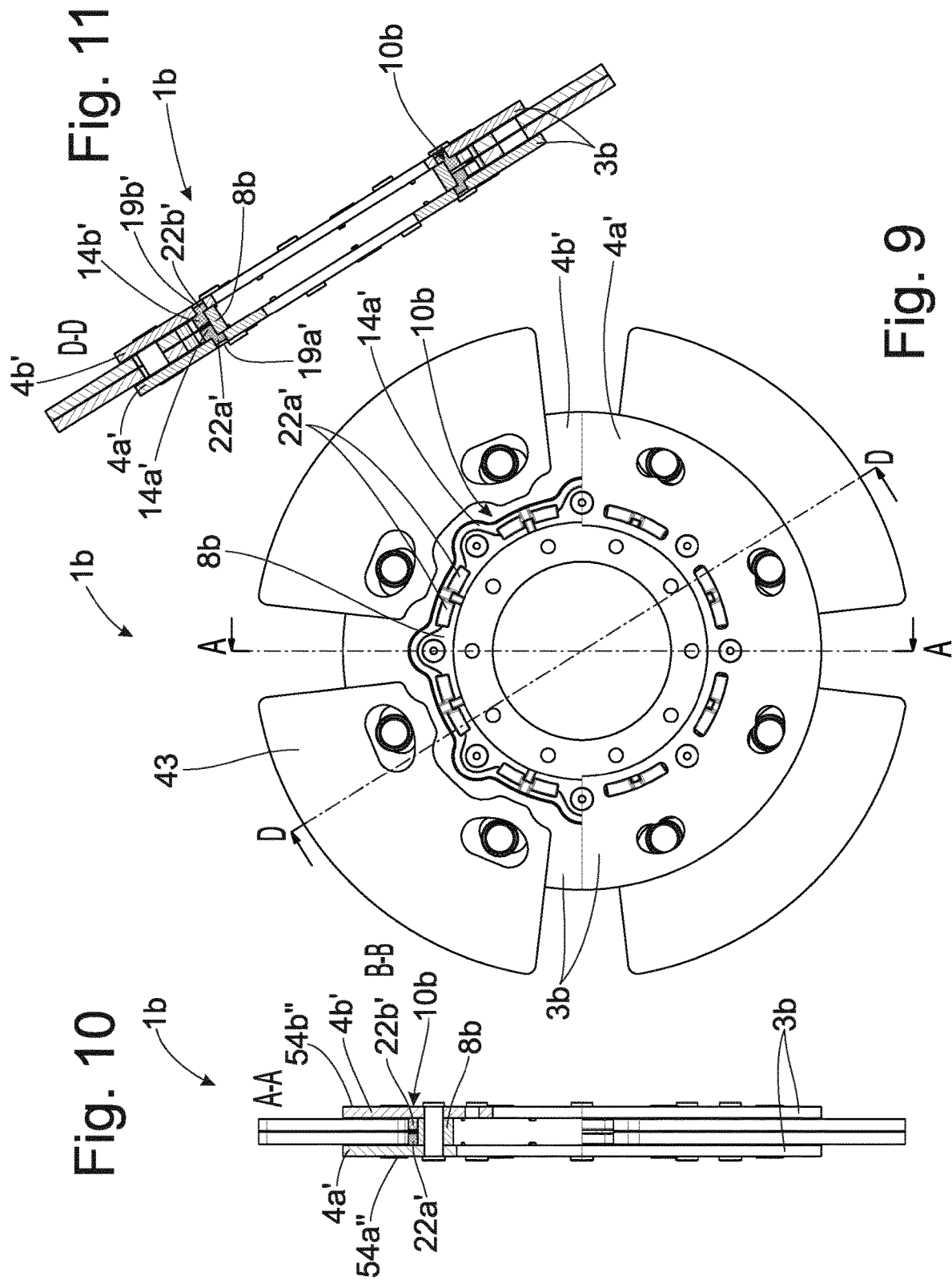

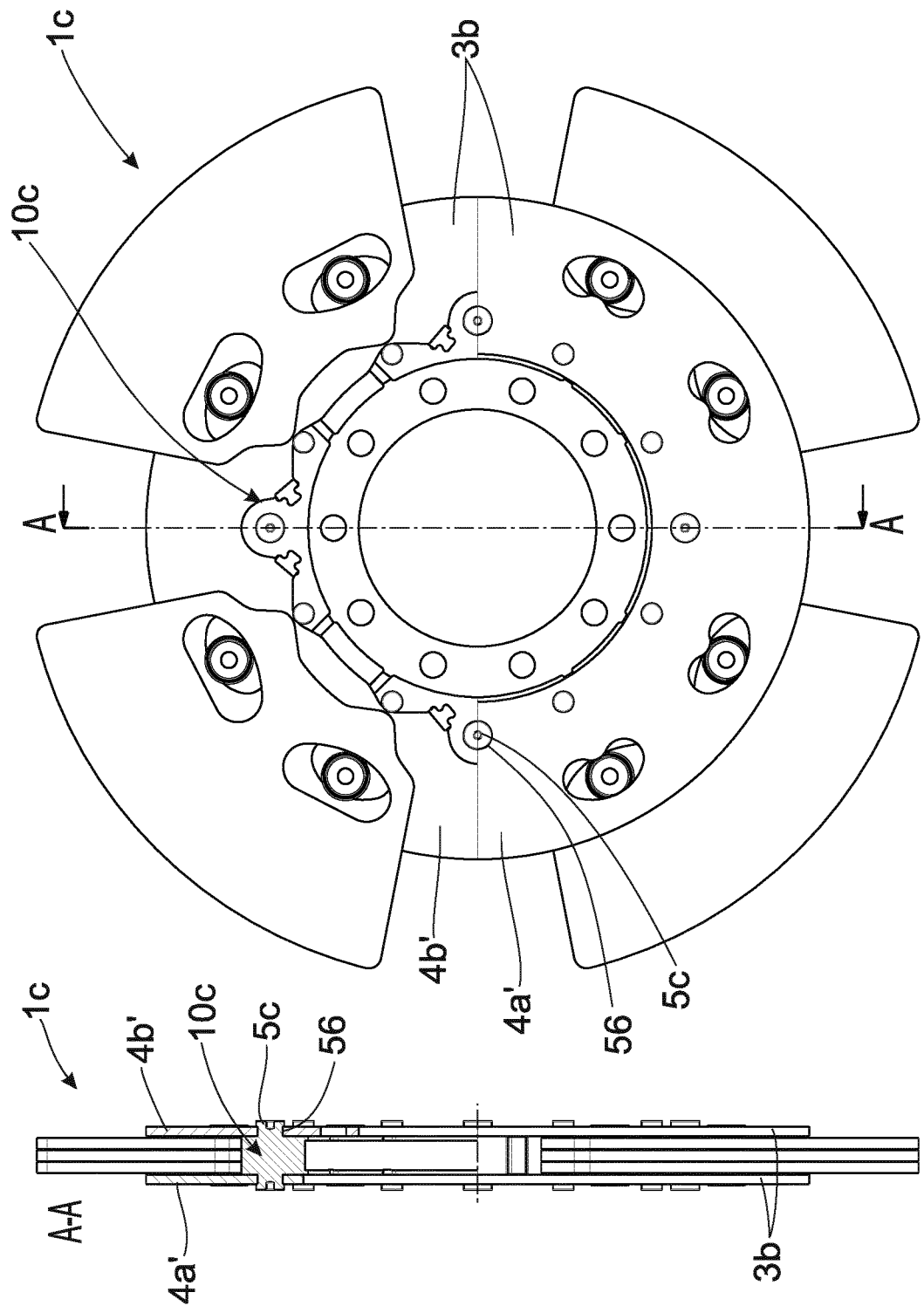

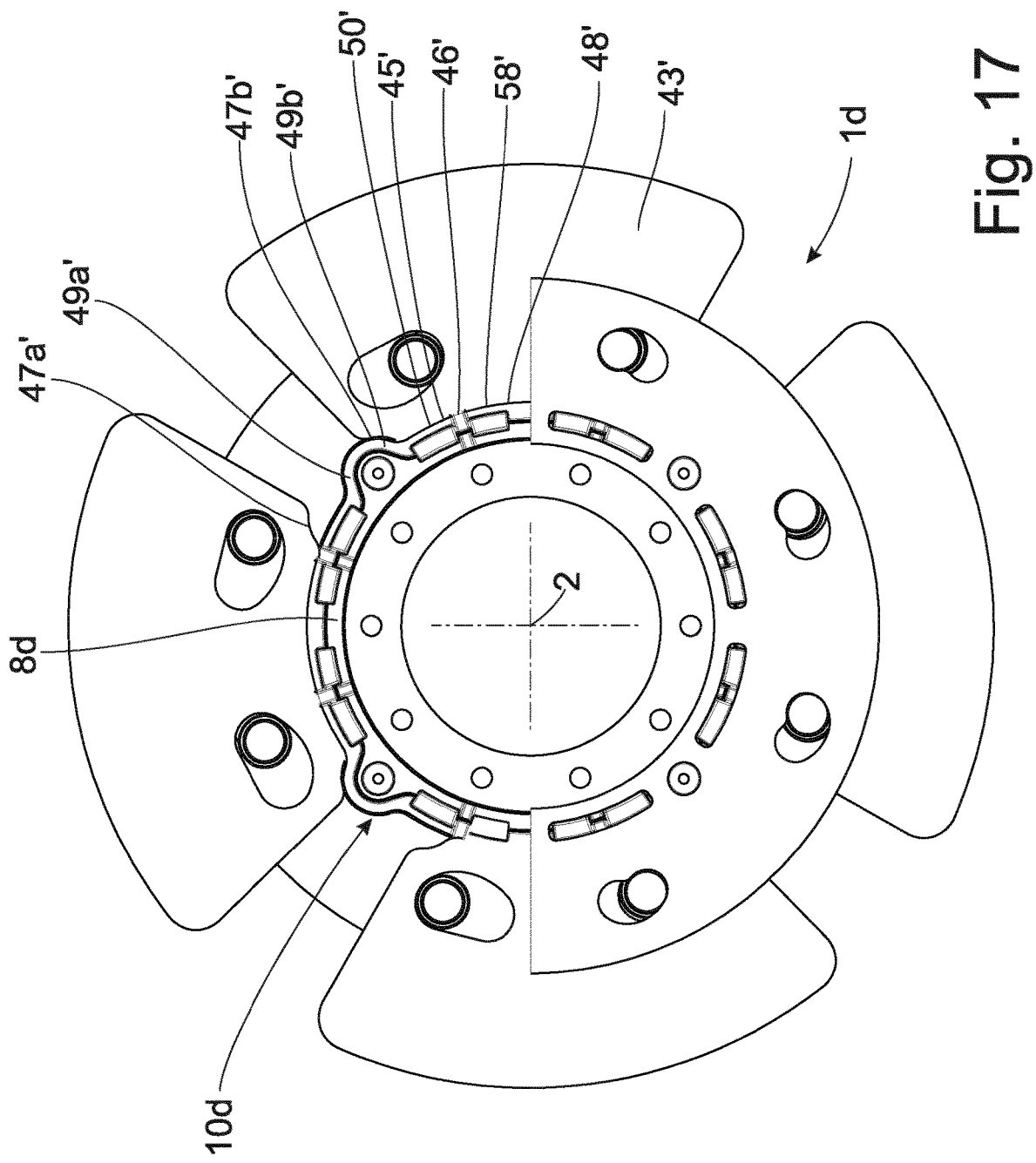

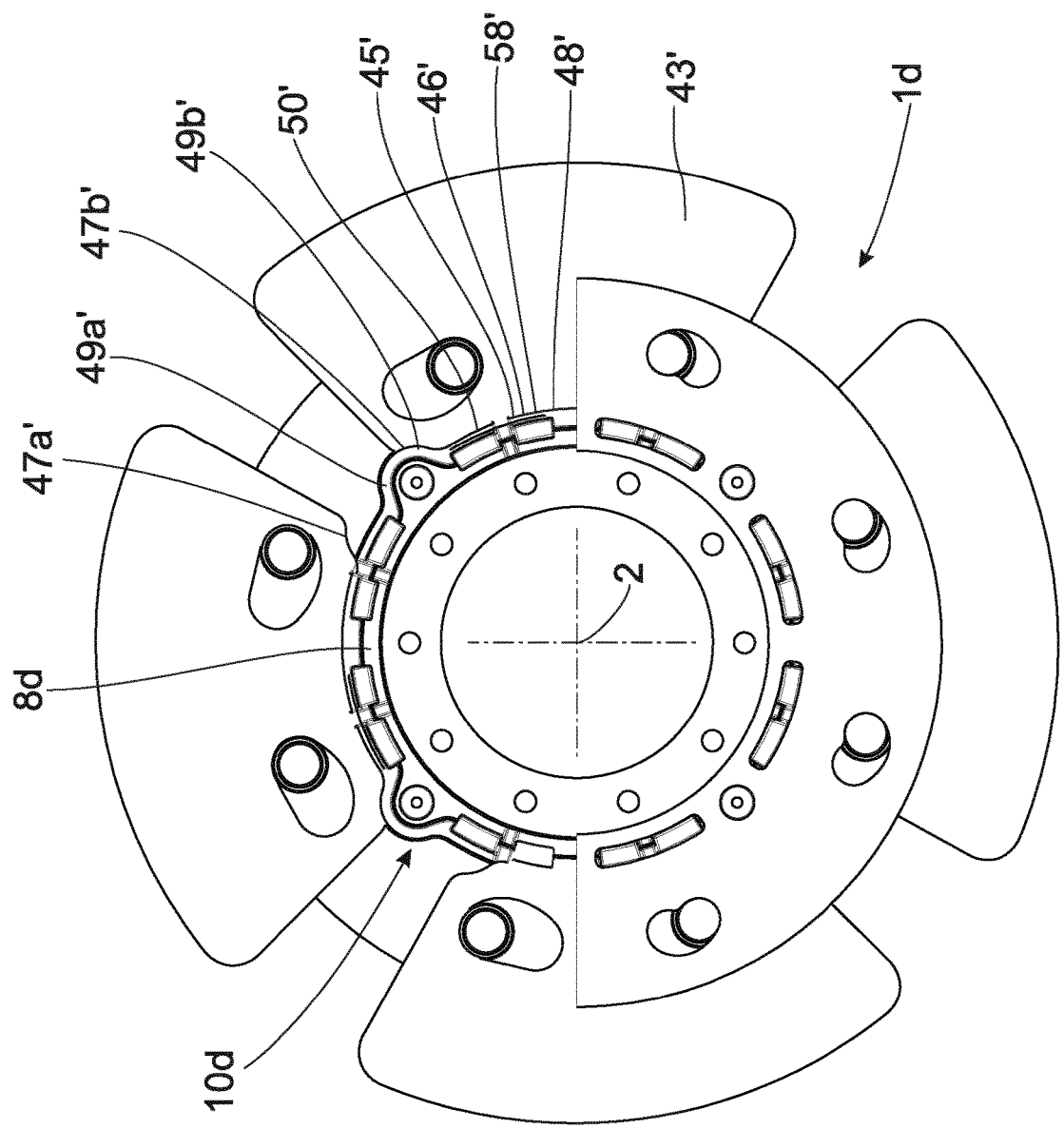

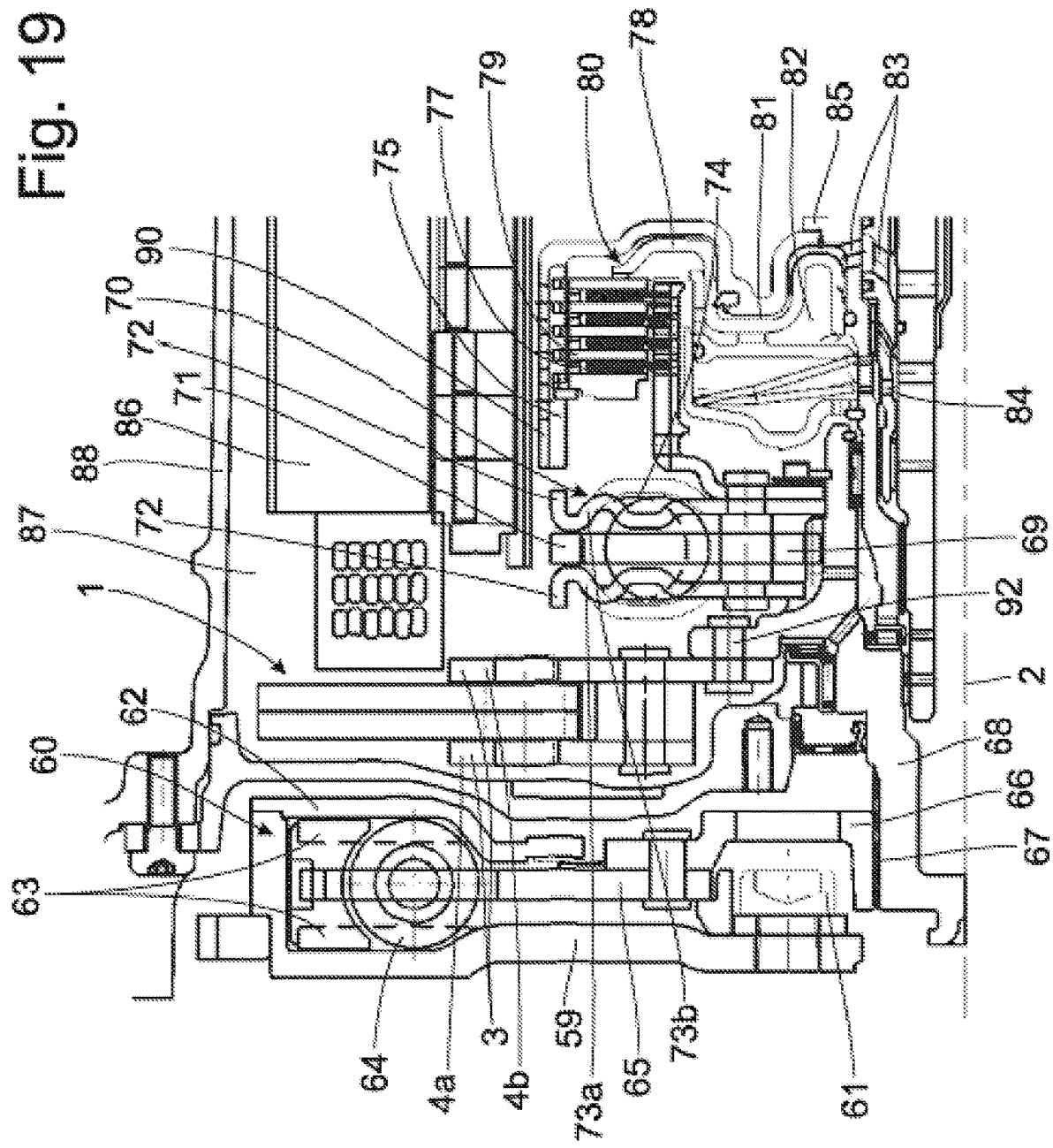

ABSORBER SYSTEM

CROSS REFERENCE TO RELATED APPLICATIONS

This is a U.S. national stage of Application No. PCT/EP2018/084295 filed Dec. 11, 2019. Priority is claimed on German Application No. DE 10 2018 201 199.0 filed Jan. 26, 2018 the content of which is incorporated herein by reference.

BACKGROUND OF THE INVENTION

1. Field of the Invention

The invention relates to a mass damper system with a damper mass carrier at which at least one damper mass is relatively movably received by coupling devices that connect guide paths in the damper mass carrier to guide paths in the at least one damper mass and at least one stop, the at least one damper mass being arranged radially outwardly of the stop and provided at its radial side facing the stop with a contact area which cooperates with a profile area which is provided at the stop at the radial side thereof facing the at least one damper mass.

2. Description of Related Art

A mass damper system of this kind is known from WO 2011/147632 A2. As can be discerned from its FIG. 1, for example, the mass damper system is provided with a damper mass carrier having two damper mass carrier elements arranged at an axial distance from one another. Pin-shaped spacers keep the two damper mass carrier elements at the predefined axial distance. As is shown in its FIG. 2, for example, damper masses are arranged axially between the two damper mass carrier elements. These damper masses and the damper mass carrier elements both have guide paths. Roll-shaped coupling devices serve in each instance to connect guide paths of the damper mass carrier to a guide path of a damper mass in order to prevent the damper mass from moving relative to the damper mass carrier. As in shown in its FIG. 3, an annular stop shown as detail in FIGS. 13 and 14 is located radially inwardly of the damper masses. This stop has a stop carrier which is enclosed by a flexible enclosure acting as stop damper. The radial outer side of this enclosure acts as a profile area of the stop that cooperates with the contact areas provided at the radial inner sides of the damper masses. The circumferentially central curvature areas shown in its FIG. 10 act as contact area of the damper masses, while axial clearances circumferentially adjoining the latter prevent the damper masses from contacting axial press-outs which are formed on at least one damper mass carrier element in the receiving area of the spacers.

It cannot be ruled out that the flexible enclosure acting as stop damper expands under centrifugal force in relation to the stop carrier fastened to one of the damper mass carrier elements, and the desired damping characteristics could accordingly be restricted at least at higher speeds. Beyond this, overstretching of the flexible enclosure cannot be ruled out, which can have long-term disadvantageous effects on the damping behavior.

SUMMARY OF THE INVENTION

It is the object of one aspect of the invention to form a stop for a mass damper system such that the latter always retains its advantageous damping characteristics independent from any influence of centrifugal force.

According to one aspect of the invention, a mass damper system has a damper mass carrier at which at least one damper mass is relatively movably received by coupling devices that connect guide paths in the damper mass carrier to guide paths in the at least one damper mass and having at least one stop, the at least one damper mass being arranged radially outwardly of the stop and provided at its radial side facing the stop with a contact area which cooperates with a profile area provided at the stop at the radial side thereof facing the at least one damper mass.

It is particularly important in this regard that the stop has, as a first constructional unit, at least one stop carrier and, as a second constructional unit, at least one stop damper connected to the stop carrier via a radial securing element.

A high resistance to deformation is imparted to the stop particularly when the at least one stop carrier is made from an at least substantially deformation-resistant material, for example, a metal material such as by injection molding. The at least one stop damper yields excellent damping characteristics when it is made from a material such as a plastic that is at least substantially prone to deformation and, because it is connected to the stop carrier by a radial securing element, the at least one stop damper will nevertheless benefit from the deformation resistance of the stop carrier in that it retains its shape at least substantially also under the influence of centrifugal force. This applies particularly when both the at least one stop carrier and the at least one stop damper of the stop are formed annularly. Further, the stop carrier can be utilized as spacer owing to its high deformation resistance. This can be advantageous in particular when the stop is provided axially between two damper mass carrier elements of the damper mass carrier, which are arranged at an axial offset. Other spacers can then be dispensed with.

Accordingly, the radial securing element becomes particularly important as regards the stop of the mass damper system. An advantageous radial securing element is provided when one of a plurality of constructional units, i.e., either the stop damper or the stop carrier of the stop or the damper mass carrier, has at least one projection that extends in a direction diverging from radial direction and which engages in a correspondingly shaped recess of one of the other constructional units, the projection and the recess, respectively, forming component parts of the radial securing element. A positive-engagement connection of the two constructional units is formed by the engagement of the projection of the one constructional unit in the corresponding recess of the other respective constructional unit, which results in the desired shape retention of the stop damper.

The projection can be provided at the constructional unit acting as stop damper or the constructional unit acting as stop carrier, and the recess can be provided at the other constructional unit acting as stop damper or as stop carrier. Likewise, the projection can also be provided at the constructional unit acting as stop damper of the stop or at the constructional unit acting as damper mass carrier, and the recess can be provided at the other constructional unit acting as stop damper or as damper mass carrier. In each case, the projection penetrates into the associated recess by a free end facing the recess.

It is particularly important that a pressure medium supply cooperating with one of the coupling devices, respectively, is associated with the radial securing element. The object of the pressure medium supply is to supply pressure medium directly to the respective coupling device in order to ensure that friction is minimized as result of the lubricating effect brought about thereby. This is the case particularly during strong rotational deflections of the damper masses relative to the damper mass carrier and, therefore, relative to the stop. In an advantageous construction, the radial securing element has a pair of projections for every coupling device, this pair of projections having a pressure medium channel between each projection in circumferential direction, which pressure medium channel faces the associated coupling device and serves as pressure medium supply. This results not only in a compact construction of the radial securing element and pressure medium supply but, beyond this, also in the projections of the radial securing element and of the respective pressure medium channel of the pressure medium supply being arranged in the circumferential extension area of the respective coupling device.

Although the stop damper is secured relative to the stop carrier in a radial direction by the radial securing element, there is also the need to secure with respect to the stop carrier in an axial direction. In order to realize this securing in a particularly simple manner, it can be provided that the at least one stop carrier is fastened to the damper mass carrier and the at least one stop damper is held axially between the damper mass carrier and the stop carrier by the at least one stop carrier. This solution is particularly advantageous when using a damper mass carrier that has at least two damper mass carrier elements arranged at an axial offset to one another and which receive the stop axially therebetween. In a construction of this kind, at least two stop dampers, each of which is held axially between one of the damper mass carriers, respectively, and the stop carrier, can be associated with the at least one stop carrier.

In order to fasten the at least one stop carrier to the damper mass carrier, the at least one stop carrier has at least one fastening area that can serve to receive at least one fastening element detachably or fixedly. In the former case, structural component parts such as spacers penetrate openings in the fastening area of the stop carrier without being fixed relative to these openings, whereas, in the latter case, these structural component parts are fixed relative to these openings, for example, as a result of a frictionally engaging or bonding connection.

When the stop carrier is configured with at least one fastening area, the at least one stop damper is provided with at least one stop damper area adapted with respect to shape to the at least one fastening area of the stop carrier and which separates the at least one fastening area of the stop carrier from the contact area of the associated damper mass. Accordingly, the stop is fixed to the damper mass carrier in the same circumferential area in which the corresponding stop damper area is arranged, so that possible torques of the damper masses can be absorbed at least substantially freely by a lever arm at the stop damper.

As has already been explained, the at least one damper mass has a contact area at its radial side facing the stop, and the stop has a profile area at its radial side facing the at least one damper mass. The contact area of the at least one damper mass has a contact zone or a plurality of contact zones in circumferential direction, and the profile area of the stop is also provided with a profile zone or with a plurality of profile zones. While the one contact zone, or the first contact zone, of the contact area is realized at the radial inner side of the respective damper mass and the one profile zone, or the first profile zone, of the profile area is realized at the radial outer side of the damper, an at least second contact zone of the contact area is located adjacent in circumferential direction to the first contact zone at the radial inner side of the respective damper mass, while an at least second profile zone of the profile area is formed in each instance by the stop damper area of the stop damper, which stop damper area is adapted with respect to shape to a fastening area of the stop carrier.

Only one contact zone at the damper mass, or the first contact zone thereof, and only one profile zone at the damper may be sufficient at speeds slightly above idling speed immediately after starting a drive unit, such as an internal combustion engine, for example, during creep operation of the vehicle in question. Although the transmitted torques are still not very high, high rotational irregularities may be operative. While these rotational irregularities lead to comparatively strong relative deflections of the at least one damper mass in circumferential direction, the centrifugal force associated with the low speed may not be sufficient for a complete deflection of the at least one damper mass in radial direction and, consequently, can provide only a small torque for restoring the at least one damper mass to its initial position. The at least one damper mass would occupy this initial position if rotational irregularities were completely absent.

However, if the at least one damper mass drops down when the drive unit is turned off due to the weight force during collapsing centrifugal force or if the rotational irregularities generated by the drive unit are so high that only one contact zone at the damper mass or only one profile zone at the stop damper would not be sufficient, then it is at least useful if not necessary to provide at least one contact zone of the contact area in circumferential direction to supplement the above-mentioned contact zone at the radial inner side of the respective damper mass and also at least a second profile zone for the profile area. In a construction of this kind, the at least one damper mass can also be brought to a standstill during high rotational irregularities generated by the drive unit before resulting in a contact between the coupling device and at least one of the guide paths in the at least one damper mass and the damper mass carrier. If the second profile zone of the profile area is formed by the stop damper area of the stop damper that is adapted with respect to shape to a fastening area of the stop carrier, the effect of this second profile zone can then be utilized without significant structural expenditure and without the need for additional structural component parts.

BRIEF DESCRIPTION OF THE DRAWINGS

Embodiment examples for a stop of a mass damper system are indicated in the following. The drawings show:

FIG. 1 is a mass damper system with a damper mass carrier having damper mass carrier elements arranged to be spaced apart axially and damper masses provided axially therebetween and, radially inwardly thereof, a stop which has a stop carrier received at the damper mass carrier elements and stop dampers provided axially at both sides of the stop carrier and received at the stop carrier;

FIG. 2 is a top view of the mass damper system with damper masses arranged in their initial position;

FIG. 3 is a section through the mass damper system according to section line A-A in FIG. 2;

FIG. 4 is the mass damper system with damper masses deflected by 46° relative to the initial position;

FIG. 9 is the mass damper system with the stop damper received at the damper mass carrier;

FIG. 10 is a section through the mass damper system according to section line A-A in FIG. 9;

FIG. 11 is a section through the mass damper system according to section line D-D in FIG. 9;

FIG. 12 is the mass damper system with fastening elements fixedly received at the stop carrier;

FIG. 13 is a section through the mass damper system according to section line A-A in FIG. 12;

FIG. 17 is the mass damper system of FIG. 15 with the damper masses deflected by 44° relative to the initial position;

FIG. 18 is the mass damper system of FIG. 15 with the damper masses deflected by 49° relative to the initial position; and FIG. 19 is the mass damper system installed in a transmission together with torsional vibration dampers, an electric machine and a clutch system.

DETAILED DESCRIPTION OF THE PRESENTLY PREFERRED EMBODIMENTS

Figure 5:
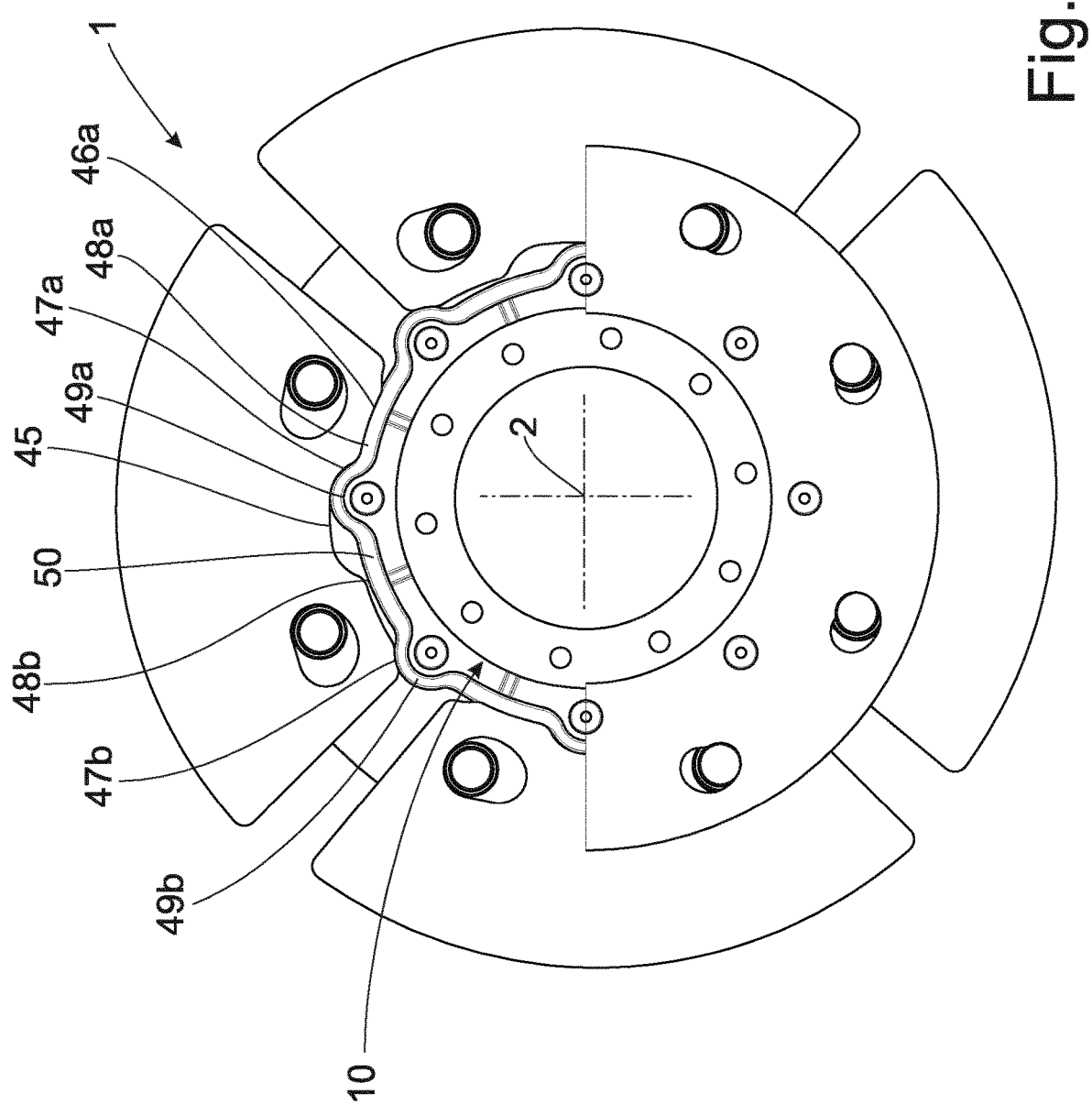
FIG. 5 is the mass damper system with damper masses deflected by 54° relative to the initial position.

FIG. 1 shows a mass damper system 1 in an exploded view. The mass damper system 1 is rotatable around a central axis 2 and has a damper mass carrier 3 with two damper mass carrier elements 4a and 4b which are held to one another by a plurality of rivet-shaped holding elements 5 arranged at comparable circumferential distances from one another in circumferential direction. As can be seen in FIG. 1, the holding elements 5 are fastened to the one damper mass carrier element 4a and, after extending through passages 6 in the other damper mass carrier element 4b, are made operative by riveting at the side of the other damper mass carrier element 4b remote of the first damper mass carrier element 4a.

In a second function, the holding elements 5 undertake to receive an at least substantially annular stop carrier 8 of a stop 10. To this end, the stop carrier 8 has fastening areas 11 at circumferential distances along its circumference which are adapted to the circumferential distances of the holding elements 5, each of which fastening areas 11 has an opening 13 through which a holding element 5 passes, respectively. The radial inner sides of the fastening areas 11 terminate flush with holding areas 12 which are adjacent in circumferential direction for each axially adjacent stop damper 14a, 14b, while, on the one hand, the radial outer sides of the fastening areas 11 protrude radially over the holding areas 12, which are adjacent in circumferential direction and, on the other hand, are rounded 15 in conformity with the shape of the openings 13.

The holding areas 12 are provided approximately in the circumferential center in each instance with a pressure medium channel 17 of a pressure medium supply 18, which pressure medium channel 17 is formed between two radial webs 16. The function of the pressure medium supply 18 will be addressed in the following. A recess 19a, 19b is provided in each instance in circumferential direction between one of these webs 16 and the adjacent fastening area 11. This recess 19a, 19b is either formed as an axial cavity opposite the corresponding axial cover side 20a, 20b of the stop carrier 8 or axially penetrates the stop carrier 8. Each of these recesses 19a, 19b serves to receive one of a plurality of projections 22a, 22b formed at the stop dampers 14a, 14b. The projections 22a provided at stop damper 14a engage by free ends 24a in axially adjacent recesses 19a, whereas the projections 22b provided at stop damper 14b engage by free ends 24b in axially adjacent recesses 19b. Together with the recesses 19a, 19b, the projections 22a, 22b form radial securing elements 23 of the stop dampers 14a, 14b relative to the stop carrier 8 and accordingly prevent radial relative movements of the stop dampers 14a, 14b with respect to the stop carrier 8 under the influence of speed-dependent centrifugal force. This is especially important when the stop dampers 14a, 14b are formed from an at least substantially deformation-prone material such as an elastomer which meets a centrifugal force-dependent deformation with only slight resistance. Conversely, owing to the radial securing elements 23, the stop dampers 14a, 14b are held at the stop carrier 8 which is at least substantially formed from deformation-resistant material such as metal and accordingly offers a high resistance to a centrifugal force-dependent deformation. The stop carrier 8 accordingly serves as first constructional unit 25 of stop 10, while the stop dampers 14a, 14b form parts of a second constructional unit 16 of the stop 10. The stop 10 acts axially between the two damper mass carrier elements 4a, 4b as spacer 52 and is held in contact with associated damper mass carrier element 4a, 4b under the effect of the holding elements 5 with both axial sides 54a, 54b.

The stop dampers 14a, 14b are dimensioned in relation to the stop carrier 8 such that they surround the stop carrier 8, namely, with fastening area enclosures 28a, 28b, which come in contact radially with the respective associated fastening areas 11 and with holding area enclosures 29a, 29b, which come in contact radially with the respective associated holding areas 12. Further, the fastening area enclosures 28a, 28b and/or the holding area enclosures 29a, 29b can further have a radial shoulder 30a, 30b in each instance which acts on the stop carrier 8 as an axial stop 31 when the stop dampers 14a, 14b are placed on in that the fastening area enclosures 28a, 28b make axial contact with the fastening areas 11 via the respective radial shoulder 30a, 30b and the holding area enclosures 29a, 29b make axial contact with the holding areas 12 via the respective radial shoulder 30a, 30b. Further, projections 22a or 22b are provided at the radial shoulders 30a, 30b of the fastening area enclosures 28a, 28b and protrude to engage in the associated recesses 19a, 19b of holding areas 12 in the respective axial direction thereof. A circumferential gap that serves as a cutout 33a, 33b and for the radial webs 16 which circumferentially bound the pressure medium channel 17 of the pressure medium supply 18 on both sides is provided between two projections 22a, 22b of a pair 32a, 32b of such projections.

After the stop 10 is fastened to the holding elements 5 of the damper mass carrier elements 4a, 4b, the stop dampers 14a, 14b are fixed to be axially secured axially between one of the damper mass carrier elements 4a, 4b and the stop carrier 8. The stop carrier 8 is enclosed radially owing to the fastening area enclosures 28 and owing to the holding area enclosures 29 and axially owing to the radial shoulders 30a and 30b.

Radially outwardly of the stop 8, the damper mass carrier elements 4a, 4b are provided in each instance with first guide paths 40a, 40b that serve to receive roll-shaped coupling devices 41. These coupling devices 41 extend further into second guide paths 42 that are provided at damper masses 43. The first guide paths 40a, 40b as well as the second guide paths 42 are formed larger in circumferential direction and in radial direction than the coupling devices 41, so that the latter can be displaced inside of guide paths 40a, 40b, 42 and accordingly ensure the possibility of a relative displacement of the damper masses 43 in these directions. The radial displacement of the damper masses 43 is carried out at least substantially under the influence of speed-dependent centrifugal force, while the circumferential displacement of the damper masses 43 is effected at least substantially through transmitted torsional vibrations or also by movements of the damper masses 43 when a drive unit, e.g., an internal combustion engine, associated with the mass damper system 1 is turned on or off.

Regardless of their operating state, the damper masses 43 always occupy a position radially outwardly of the stop 10 so that a contact area 45 provided at the radial inner contour 58 of the damper masses 43 that faces the stop 10 is also located radially outwardly of the stop 10. This contact area 45 has a plurality of contact zones 46a, 46b, 47a, 47b of that contact zones 46a or 46b cooperate in each instance with a profile zone 48 of a profile area 50 at the stop 10, contact zone 47a cooperates with a profile zone 49a of profile area 50, and contact zone 47b cooperates with a profile zone 49b of profile area 50. The profile zone 48 of the stop 10 is provided in each instance at the stop dampers 14a, 14b of the stop 10 at the radial sides thereof facing the damper masses 43. The first contact zones 46a, 46b of the damper masses 43 are provided at least substantially in the area of the respective associated coupling device 41 in circumferential direction, while the second contact zones 47a, 47b are provided at least substantially in the circumferential end areas of the respective damper mass 43 in circumferential direction. In a corresponding manner, the first profile zone 48 is provided at the outer radial sides of the respective holding area enclosures 29a, 29b of the stop dampers 14a, 14b, and the second profile zones 49a, 49b are provided, respectively, at the outer radial sides of the respective fastening area enclosures 28a, 28b of the stop dampers 14a, 14b.

On the other hand, the respective pressure medium channel 17 of the pressure medium supply 18 is arranged in circumferential direction in each instance in such a way that it is at least substantially aligned with the guide paths 40 and 42 and, in particular with the roll-shaped coupling devices 41 for supplying the same with pressure medium. This is clearly visible in FIG. 2 in which the front damper mass carrier element 4a in viewing direction is cut out to show a damper mass 43 and the stop 10. The mass damper system 1, which is shown in an exploded view in FIG. 1, is shown in the assembled state in FIG. 3.

In FIG. 2, the damper masses 43 occupy a position in which a deflection of the damper masses 43 radially outward takes place through rotation of the mass damper system 1 around the central axis 2. However, owing to the absence of torsional vibration, the damper masses 43 are free from a deflection in circumferential direction. In an operating state of this kind, both the first contact zones 46a, 46b of contact area 45 of the respective damper mass 43 and the second contact zones 47a, 47b of contact area 45 of the respective damper mass 43 are spaced apart in each instance from the corresponding profile zones 48a or 48b of profile area 50 at the stop 10 or from the corresponding profile zones 49a or 49b of profile area 50 at the stop 10.

FIG. 4 shows the mass damper system 1 of FIGS. 1 to 3 with the damper masses 43 deflected by 46° relative to the initial position shown in FIG. 2. The damper masses 43 once again occupy a position in which there is a deflection of the damper masses 43 radially outward as a result of the rotation of the mass damper system 1 around the central axis 2, although the damper masses 43 undergo an additional deflection in circumferential direction as a consequence of the presence of circumferential deflection, for example, owing to torsional vibrations. The corresponding first contact zones 46a, 46b in deflection direction, in this instance the first contact zone 46a, of contact area 45 of the respective damper mass 43 come in contact at least substantially radially with the corresponding profile zone 48a of profile area 50 at stop 10 without the second contact zones 47a, 47b of contact area 45 of the respective damper mass 43 already coming in contact with the corresponding profile zone 49a or 49b of profile area 50 at the stop 10.

FIG. 5 shows the mass damper system 1 of FIGS. 1 to 3 with the damper masses 43 deflected by 54° relative to the initial position shown in FIG. 2. In this case also, the damper masses 43 occupy a position in which a deflection of the damper masses 43 takes place radially outward through rotation of the mass damper system 1 around the central axis 2, but the damper masses 43 now undergo a further deflection in circumferential direction as a consequence of an even stronger circumferential deflection. In so doing, the corresponding second contact zones 47a or 47b of contact area 45 of the respective damper mass 43 in deflection direction come in contact with the corresponding profile zones 49a or 49b of profile area 50 at stop 10. The first contact zone 46a of contact area 45 of the respective damper mass 43 that is already in contact with the corresponding profile zone 48 of profile area 50 at stop 10 remains in contact.

Figure 6:
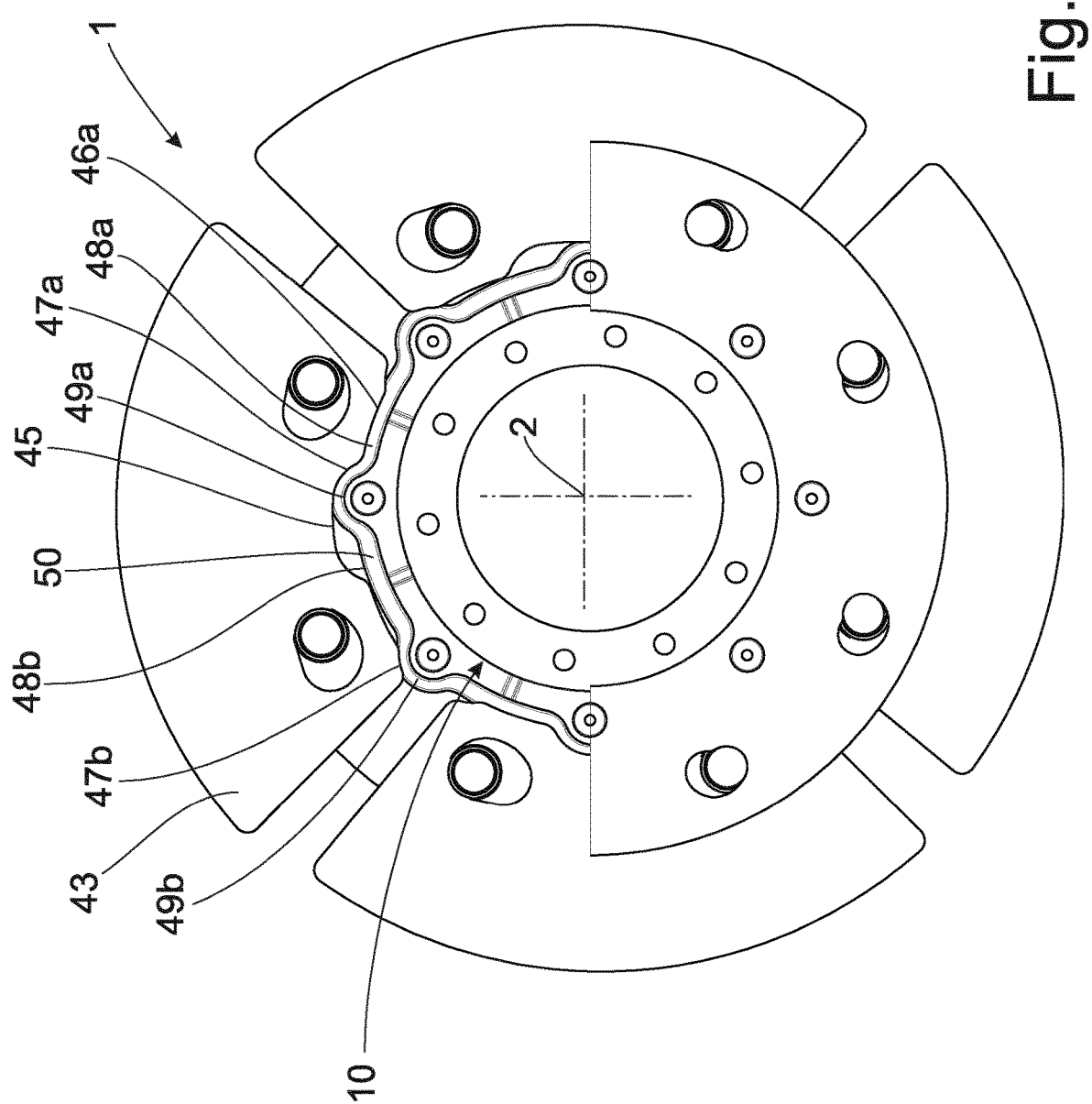
FIG. 6 is the mass damper system with damper masses deflected by 60° relative to the initial position.

Finally, FIG. 6 shows the mass damper system 1 of FIGS. 1 to 3 with damper masses 43 deflected by 60° relative to the initial position shown in FIG. 2. In this case also, the damper masses 43 occupy a position in which a deflection of the damper masses 43 radially outward takes place as a result of rotation of the mass damper system 1 around the central axis 2. However, owing to a very strong circumferential deflection, the respective damper mass 43 undergoes a deflection in circumferential direction, which leads to an elastic deformation of the corresponding profile zones 49a or 49b of profile area 50 at stop 10 in deflection direction.

Another stop, not shown, is required for even more extensive deflections of the damper masses 43 in order, on the one hand, to prevent a plastic deformation of the corresponding profile zones 49a, 49b of profile area 50 at stop 10 in deflection direction, which could cause irreparable damage to the stop dampers 14a, 14b and, on the other hand, to prevent damage to the holding elements 5.

Figure 7:
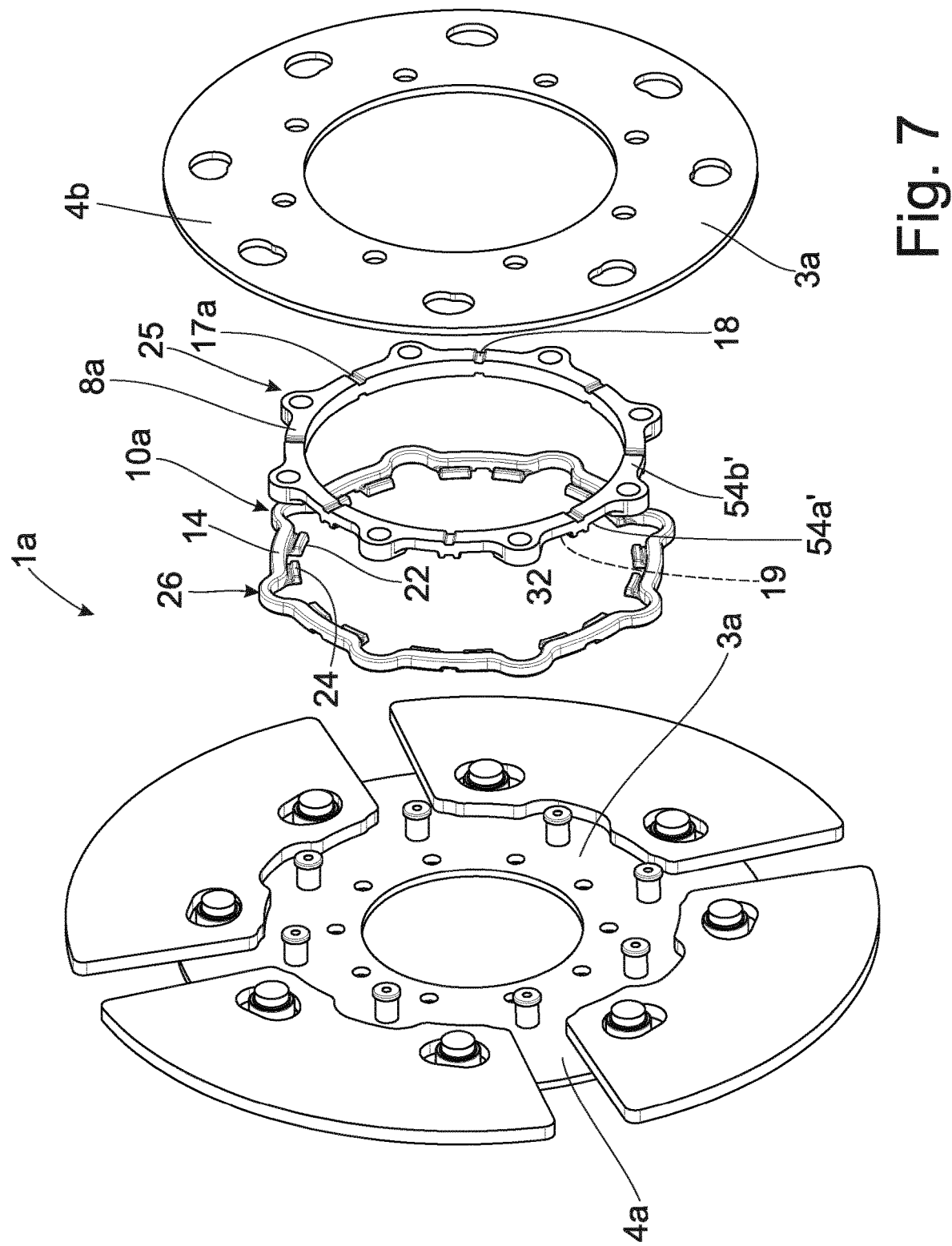
FIG. 7 is the mass damper system with a stop carrier having a stop damper only at one axial side.
Figure 8:
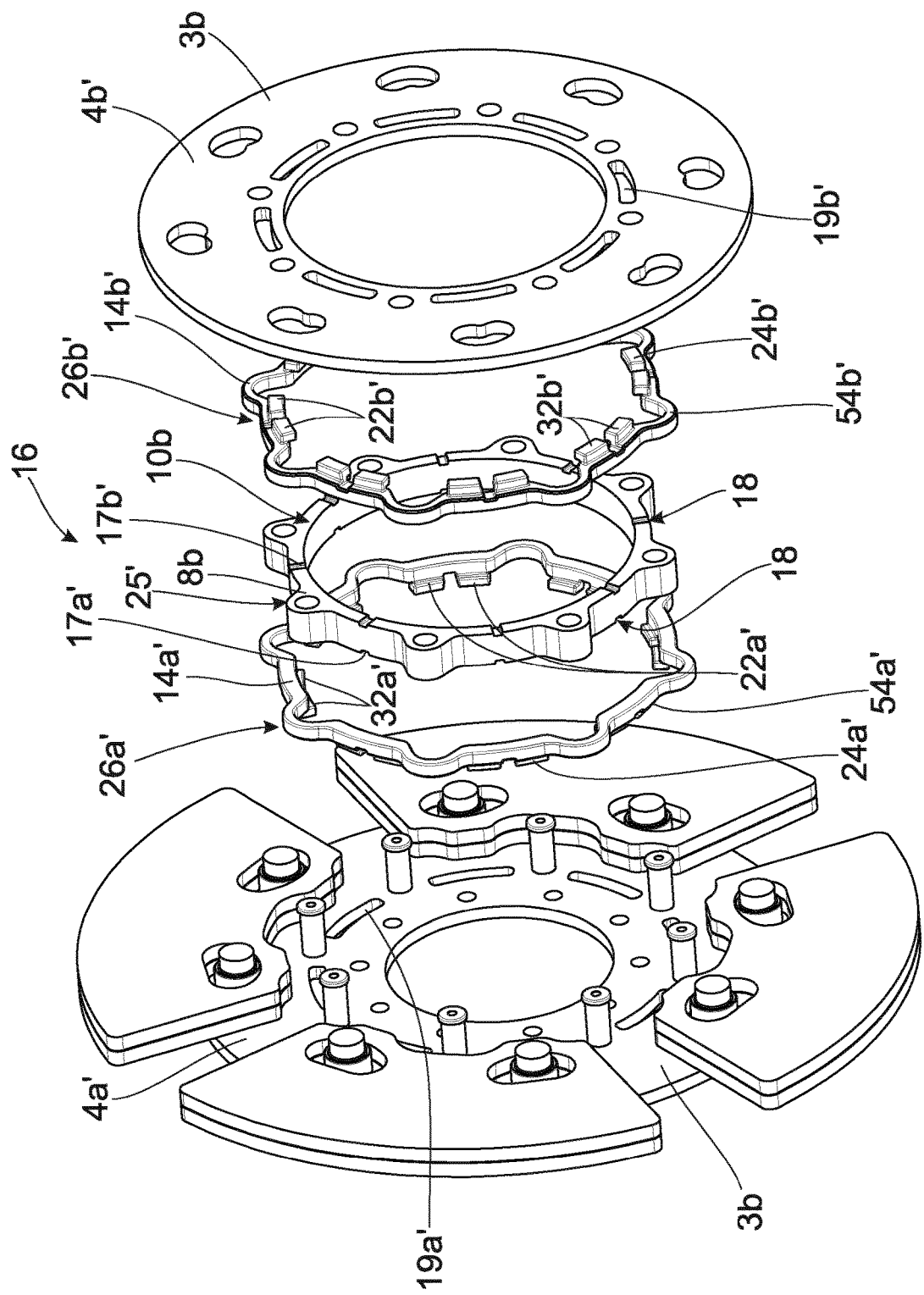
FIG. 8 is the mass damper system with the stop damper received at the damper mass carrier.

The mass damper system 1a of FIG. 7 is provided with only one stop damper 14 that acts as a constructional unit 26 and which is fitted to the stop carrier 8a to form the stop 10a acting as constructional unit 25 proceeding from the side of the one damper mass carrier element 4a of damper mass carrier 3a such that the projections 22 of the respective pair of projections 32 engage in the recesses 19, not visible in FIG. 7, of stop carrier 8a by their free ends 24 facing stop carrier 8a. Since no stop damper is provided at the axial side 54b' of stop carrier 8a facing the other damper mass carrier element 4b, recesses for projections provided at a stop damper as well as radial webs at both sides of the respective pressure medium channel 17a of the pressure medium supply 18 can be dispensed with at this axial side 54b'. Instead, the pressure medium channels 17a are incorporated in this otherwise planar axial side 54b' of the stop carrier 8a proceeding from the side of the other damper mass carrier element 4b. There are no differences in terms of function between this and the mass damper system 1 discussed up to this point.

In the mass damper system 1b shown in FIGS. 8 to 11 as in the mass damper system 1 according to FIGS. 1 to 6, a stop damper 14a' and 14b' acting as constructional unit 26' is associated at both sides with the stop carrier 8b of stop 10b acting as constructional unit 25', but the projections 22a' and 22b' of this stop damper 14a' and 14b' engage by their free ends 24a', 24b' in recesses 19a', 19b' of the respective adjacent damper mass carrier element 4a', 4b' of the damper mass carrier 3b instead of in recesses 19a, 19b in the stop carrier 8. The projections 22a' and 22b' of the respective pair of projections (32a', 32b') of the stop dampers 14a' and 14b' therefore extend proceeding from the side axially remote from the stop carrier 8b in direction of the respective adjacent damper mass carrier element 4a' or 4b' to enter into engagement with recesses 19a' or 19b'. Correspondingly, the axial sides 54a', 54b' of stop carrier 8b that face the stop dampers 14a' and 14b' are formed planar with the exception of the pressure medium channels 17a', 17b' of the pressure medium supply 18. There are no differences in terms of function between this and the mass damper system 1 according to FIGS. 1 to 6.

Figure 14:
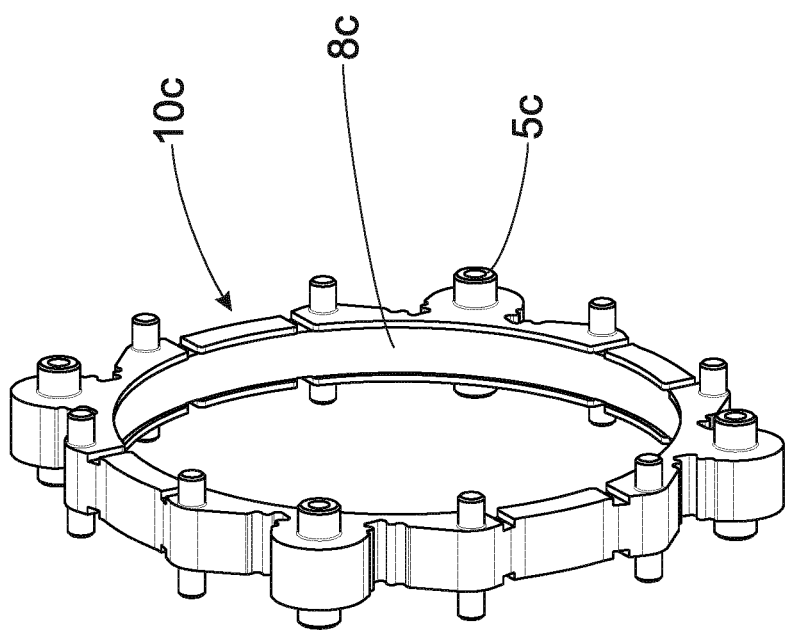
FIG. 14 is the stop carrier of the mass damper system of FIGS. 12 and 13 shown separately in three-dimensional view.

The stop 10 is also fastened to the damper mass carrier elements 4a, 4b in the mass damper system 1c shown in FIGS. 12 to 14. As will be discerned particularly from FIG. 14, the holding elements 5c required for this purpose respectively form part of the stop carrier 8c in that they are either formed integral with the stop carrier 8c or are fastened to it, for example, by pressing in. According to FIG. 12, passages 56 which are penetrated in each instance by the holding elements 5c are provided in the damper mass carrier elements 4a', 4b'. After carrying out riveting from the side of the respective damper mass carrier element 4a, 4b remote of the stop 10c, the fixed connection between the damper mass carrier elements 4a, 4b and the stop 10c is produced.

The mass damper system 1d according to FIGS. 15 to 18 differs from the mass damper system 1b according to FIGS. 8 to 11 by reason of the radial inner contour 58' of the damper masses 43'. Specifically, these damper masses 43' are drawn radially inward just as far in the circumferential area between the coupling devices 41 as in the circumferential areas of the coupling devices 41. The inertia of the respective damper mass 43' can be increased in this way. Such a radial inner contour 58' of the damper masses 43' can be realized when holding elements 5 provided only between the damper masses 43' in circumferential direction are used for the fastening of the stop 10d, and the stop 10d can accordingly be dispensed with on fastening areas 11 in the circumferential area of the damper mass 43'.

Figure 15:
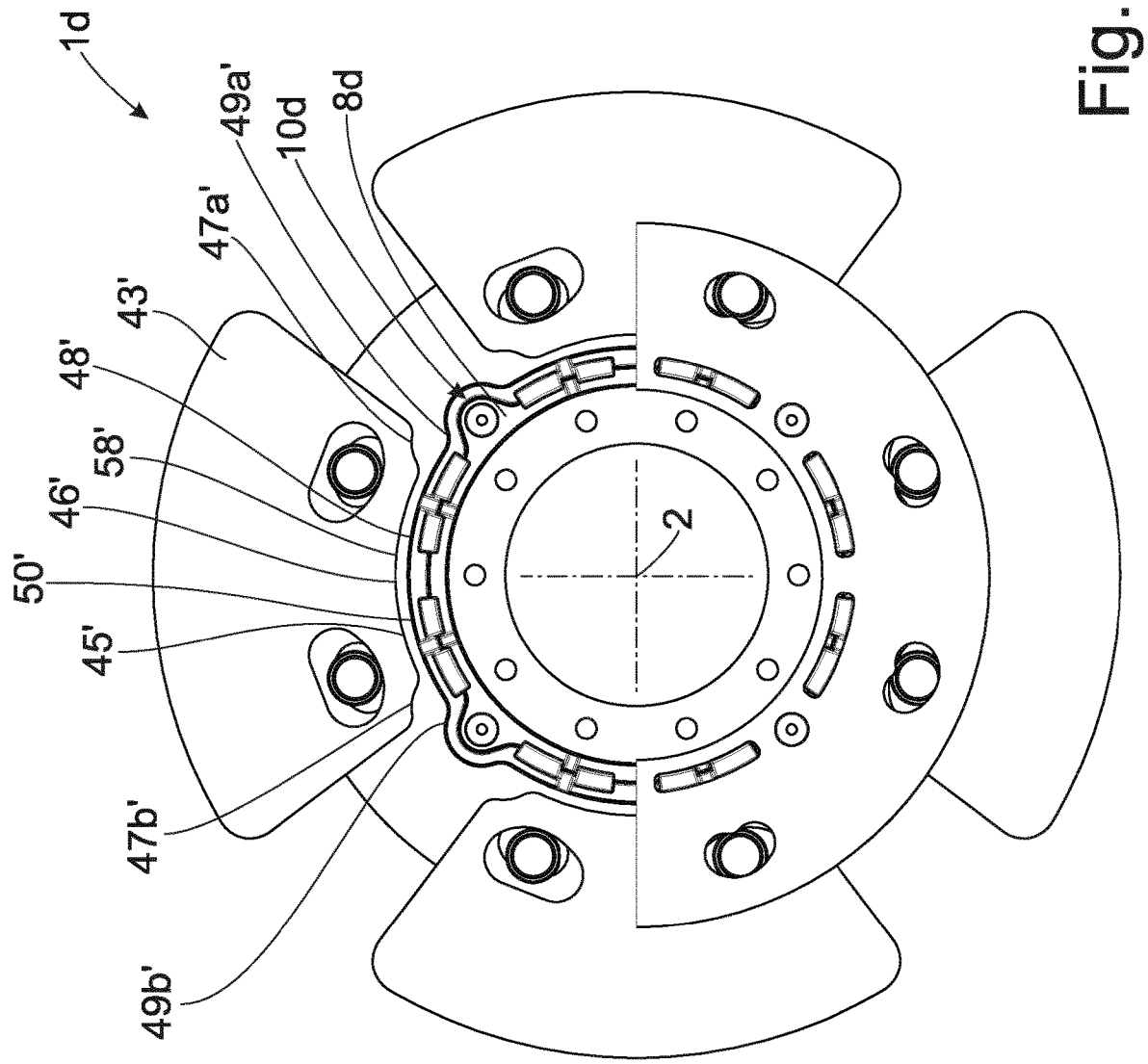
FIG. 15 is the mass damper system with the damper masses formed with another radial inner side, with the damper masses occupying their initial position.

In FIG. 15, the damper masses 43' occupy a position in which a deflection of the damper masses 43' radially outward takes place as a result of rotation of the mass damper system 1d around the central axis 2, but the damper masses 43' are free from a deflection in circumferential direction due to the absence of torsional vibration. In an operating state of this kind, the first contact zone 46' of contact area 45' of the respective damper mass 43' and the second contact zones 47a', 47b' of contact area 45' of the respective damper mass 43' are spaced apart in each instance from the corresponding profile zone 48' of profile area 50' at the stop 10d or from the corresponding profile zones 49a', 49b' of profile area 50' at the stop 10d.

Figure 16:
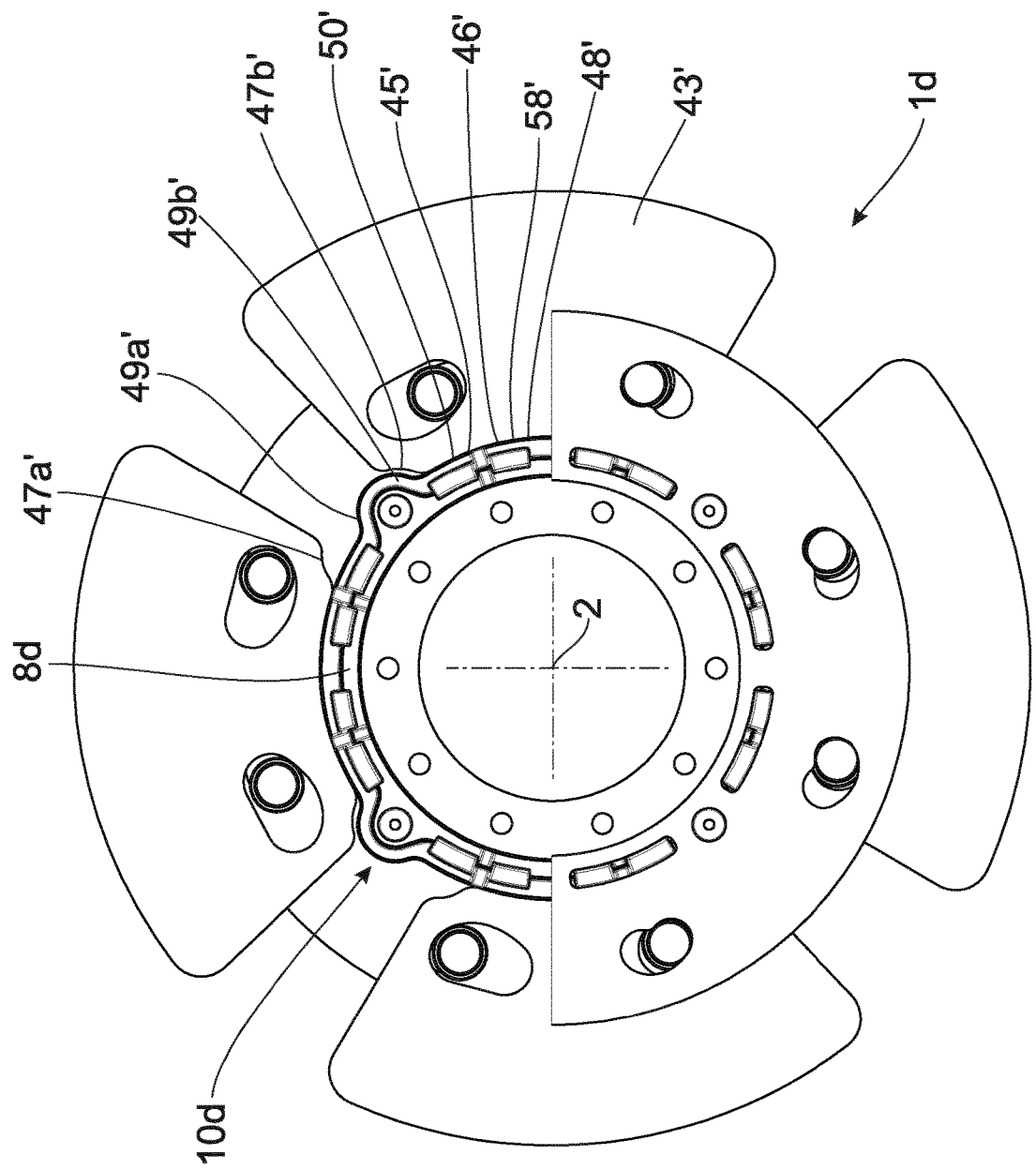
FIG. 16 is the mass damper system of FIG. 15 with the damper masses deflected by 39° relative to the initial position.

FIG. 16 shows the mass damper system 1d with the damper masses 43' deflected by 39° relative to the initial position shown in FIG. 15. The damper masses 43' once again occupy a position in which there is a deflection of the damper masses 43' radially outward as a result of the rotation of the mass damper system 1d around the central axis 2, although the damper masses 43' now undergo an additional deflection in circumferential direction as a consequence of the presence of circumferential deflection, for example, owing to torsional vibrations. The corresponding first contact zone 46' of contact area 45' of the respective damper mass 43' in deflection direction comes in contact at least substantially radially with the profile zone 48' of profile area 50' at stop 10d without the second contact zones 47a' or 47b' of contact area 45' of the respective damper mass 43' already coming in contact with the corresponding profile zone 49a' of profile area 50' at the stop 10d or with corresponding profile zone 49b' of profile area 50' at stop 10d.

FIG. 17 shows the mass damper system 1d with the damper masses 43' deflected by 44° relative to the initial position shown in FIG. 15. In this case also, the damper masses 43' occupy a position in which a deflection of the damper masses 43' takes place radially outward through rotation of the mass damper system 1d around the central axis 2, but the damper masses 43' now undergo a further deflection in circumferential direction as a consequence of an even stronger circumferential deflection. In so doing, the corresponding second contact zones 47a', 47b' of contact area 45' of the respective damper mass 43' in deflection direction come in contact with the corresponding profile zones 49a', 49b' of profile area 50' at stop 10d. The first contact zone 46' of contact area 45' of the respective damper mass 43' which is already in contact with the corresponding profile zone 48' of profile area 50' at stop 10d remains in contact.

Finally, FIG. 18 shows the mass damper system 1d with damper masses 43' deflected by 49° relative to the initial position shown in FIG. 15. In this case also, the damper masses 43' occupy a position in which a deflection of the damper masses 43' radially outward takes place as a result of rotation of the mass damper system 1d around the central axis 2. However, owing to a very strong circumferential deflection, the respective damper mass 43' undergoes a deflection in circumferential direction, which leads to an elastic deformation of the corresponding profile zones 49a' or 49b' of profile area 50' at stop 10d in deflection direction.

An installation situation for the mass damper system 1 is shown in FIG. 19 by way of example and also representatively for mass damper systems 1a, 1b, 1c or 1d. An input flange 59 of a first torsional vibration damper 60 is fastened to a crankshaft of an internal combustion engine, not shown, by fastening elements 61. The input flange 59 as well as a cover element 62, which is fixedly connected thereto, has control elements 63 for a circumferential energy storage set 64 which is supported at its other end at a hub disk 65. The hub disk 65 receives a torsional damper hub 66 so as to be fixed with respect to relative rotation. The torsional damper hub 66 is connected by a toothing 67 to a drive hub 68 so as to be fixed with respect to rotation relative to it. On the one hand, in input 69 of a second torsional vibration damper 70 in the form of a hub disk 71 is received at the drive hub 68 so as to be fixed with respect to rotation relative to it and, on the other hand, a damper mass carrier element 4a or 4b, for example, the damper mass carrier element 4b of damper mass carrier 3, is fastened to the drive hub 68 by riveting 92. An output 72 of the second torsional vibration damper 70 formed by cover elements 73a and 73b at both sides of the hub disk 71 is operatively connected to the input 69 of this torsional vibration damper 70 by a circumferential energy storage set 74 and additionally receives a first clutch element carrier 75 of a clutch system 76. First clutch elements 77 are received at the first clutch element carrier 75 so as to be fixed with respect to rotation but axially displaceable relative to it. The clutch elements 77 can be brought into operative connection with second clutch elements 79 of the clutch system 76 by a clutch piston 78 of a clutch arrangement 80 if a higher pressure should be present in a pressure space 81 adjacent to the clutch piston 78 than in a cooling space 82 impinging on the opposite side of the clutch piston 78. Conversely, the operative connection between the first clutch elements 77 and the second clutch elements 79 is cancelled if a higher pressure should be present in the cooling space 82 than in the pressure space 81. The pressure space 81 and the cooling space 82 are supplied by pressure medium lines 83, 84.

The second clutch elements 79 are received at a second clutch element carrier 90 so as to be fixed with respect to rotation but axially displaceable relative to it. The second clutch element carrier 90 is connected to an output shaft 85 so as to be fixed with respect to rotation relative to it on the one hand and is radially surrounded by an electric machine 86 on the other hand. The clutch system 76 can be utilized to decouple the electric machine 86 from the internal combustion engine or to connect the electric machine 86 to the internal combustion engine.

The two torsional vibration dampers 60 and 70 as well as the clutch system 76, the mass damper system 1 and the electric machine 86 are arranged in a space 87 of a transmission 88. This space 87 is filled at least with a small amount of pressure medium so that this can be taken as a wet space. As has already been mentioned in connection with FIGS. 1 to 3, the pressure medium contained in the space 87 is directed via pressure medium channels 17 of the pressure medium supply 18 of the mass damper system 1 to the coupling devices 41 which engage in the guide paths 40 of the damper mass carrier elements 4a and 4b and in the guide paths 42 of the damper masses 43.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mass damper system comprising:
   at least one damper mass having at least one guide path;
   at least one coupling device;
   at least one damper mass carrier including at least one guide path, the at least one damper mass is relatively movably received by the at least one coupling device that connects the at least one guide path in the at least one damper mass carrier to the at least one guide path in the at least one damper mass;
   at least one stop having a profile area, wherein the at least one damper mass is arranged radially outwardly of the at least one stop and the at least one damper mass is provided at a radial side facing the at least one stop with a contact area that cooperates with the profile area, which is provided at the at least one stop at a radial side thereof facing the at least one damper mass,
   wherein the at least one stop comprises:
      at least one first constructional unit comprising at least one stop carrier; and
      at least one second constructional unit comprising at least one stop damper connected to the at least one stop carrier;
      at least one lubricant channel formed into an axial end face of the at least one stop, the at least one lubricant channel configured to direct lubricant towards the at least one coupling device.

2. The mass damper system according to claim 1, wherein the at least one stop damper includes at least one projection which engages a respective recess formed in one of the at least one stop carrier or the at least one damper mass carrier.

3. The mass damper system according to claim 2, wherein the at least one projection includes two projections and the at least one lubricant channel is disposed between the two projections.

4. The mass damper system according to claim 1, wherein the at least one stop damper is disposed axially between the at least one stop carrier and the at least one damper mass carrier.

5. The mass damper system according to claim 1, wherein the at least one damper mass carrier includes two damper mass carriers, the two damper mass carriers axially separated from each other.

6. The mass damper system according to claim 5, wherein the at least one stop damper includes two stop dampers.

7. The mass damper system according to claim 6, wherein each of the two stop dampers is disposed axially between the at least one stop carrier and a respective one of the two damper mass carriers.

8. The mass damper system according to claim 1, wherein the at least one stop carrier includes at least one fastening area and the at least one stop damper includes at least one fastening area enclosure.

9. The mass damper system according to claim 8, wherein the at least one fastening area of the at least one stop carrier receives at least one holding element.

10. The mass damper system according to claim 8, wherein the at least one fastening area enclosure of the at least one stop damper is shaped to surround the at least one fastening area of the at least one stop carrier such that when the at least one damper mass contacts the at least one stop, the at least one damper mass contacts the at least one fastening area enclosure of the at least one stop damper.

11. The mass damper system according to claim 1, wherein the at least one stop carrier and the at least one stop damper are formed annularly.

12. The mass damper system according to claim 1, wherein the at least one stop damper is formed of an elastically deformable material.

13. The mass damper system according to claim 1, wherein the at least one damper mass includes two protrusions extending from the radial side facing the at least one stop, the two protrusions are configured to contact the at least one stop.

* * * * *